United States Patent [19]

Appeldorn et al.

[11] Patent Number: 5,659,643
[45] Date of Patent: Aug. 19, 1997

[54] NOTCHED FIBER ARRAY ILLUMINATION DEVICE

[75] Inventors: Roger H. Appeldorn, Grant Township, County of Washington, Minn.; Michael C. Lea, Harlow, England

[73] Assignee: Minnesota Mining and Manufacturing Company, St. Paul, Minn.

[21] Appl. No.: 384,587

[22] Filed: Jan. 23, 1995

[51] Int. Cl.⁶ .................................................. G02B 6/26
[52] U.S. Cl. ............................. 385/31; 385/47; 385/901; 362/32
[58] Field of Search ................................. 385/31, 32, 47, 385/123, 147, 124, 125, 901; 362/32

[56] References Cited

U.S. PATENT DOCUMENTS

| | | | |
|---|---|---|---|
| 4,059,916 | 11/1977 | Tachihara et al. | 40/130 K |
| 4,171,844 | 10/1979 | Landaal et al. | 296/57 R |
| 4,173,390 | 11/1979 | Käch | 385/44 |
| 4,234,907 | 11/1980 | Daniel | 362/32 |
| 4,285,889 | 8/1981 | Parsons | 264/2.6 |
| 4,307,932 | 12/1981 | Winzer | 385/48 |
| 4,422,719 | 12/1983 | Orcutt | 385/125 X |
| 4,447,118 | 5/1984 | Mulkey | 385/47 X |
| 4,460,940 | 7/1984 | Mori | 362/32 |
| 4,466,697 | 8/1984 | Daniel | 385/123 |
| 4,471,412 | 9/1984 | Mori | 362/32 |
| 4,519,017 | 5/1985 | Daniel | 362/32 |
| 4,575,180 | 3/1986 | Chang | 385/47 |
| 4,576,436 | 3/1986 | Daniel | 350/96.1 |
| 4,642,736 | 2/1987 | Masuzawa et al. | 362/31 |
| 4,648,690 | 3/1987 | Ohe | 350/321 |
| 4,690,490 | 9/1987 | Mori | 385/47 |
| 4,729,068 | 3/1988 | Ohe | 362/31 |
| 4,743,410 | 5/1988 | Grethen et al. | 264/1.4 |
| 4,822,123 | 4/1989 | Mori | 350/96.1 |
| 4,845,596 | 7/1989 | Mouissie | 362/32 |
| 4,865,417 | 9/1989 | Naohiro et al. | 350/96.3 |
| 4,885,663 | 12/1989 | Parker | 362/32 |
| 4,907,132 | 3/1990 | Parker | 362/32 |
| 4,929,169 | 5/1990 | Fujigaki et al. | 425/385 |
| 5,005,931 | 4/1991 | Mori | 385/901 X |
| 5,009,020 | 4/1991 | Watanabe | 362/32 X |
| 5,037,172 | 8/1991 | Hekman et al. | 385/31 |
| 5,050,946 | 9/1991 | Hathaway et al. | 385/901 X |
| 5,187,765 | 2/1993 | Muehlemann et al. | 385/901 X |
| 5,226,105 | 7/1993 | Myers | 385/147 |
| 5,298,327 | 3/1994 | Zarian et al. | 428/373 |
| 5,432,876 | 7/1995 | Appeldorn et al. | 385/901 X |

FOREIGN PATENT DOCUMENTS

| | | | |
|---|---|---|---|
| 53-29740 | 3/1978 | Japan | 385/44 |
| 62-9205 | 1/1987 | Japan | G02B 6/00 |
| 62-9206 | 1/1987 | Japan | G02B 6/00 |
| 63-121002 | 5/1988 | Japan | G02B 6/00 |
| 63-253903 | 10/1988 | Japan | G02B 6/00 |

*Primary Examiner*—Phan T. H. Palmer
*Attorney, Agent, or Firm*—Minnesota Mining and Manufacturing Company

[57] ABSTRACT

An optical fiber having a core is disclosed. A notch having first and second sides is formed in the fiber and extends into the core. At least the portion of the interior of the notch adjacent the first side has an index of refraction less than that of the core. Light travelling at a first angle to the fiber axis and striking the first side will be totally internally reflected if the first angle is greater than a predetermined angle. If the first angle is less than the predetermined angle, a portion of the light will enter the notch and emerge through the second surface making a second angle to the first surface, the second angle being greater than the first.

15 Claims, 2 Drawing Sheets

NOTCHED FIBER ARRAY ILLUMINATION DEVICE

BACKGROUND OF THE INVENTION

Optical fibers are well-known devices for conducting electromagnetic radiation. A typical optical fiber will have a core in which the radiation is conducted surrounded by a cladding having a lower index of refraction. The radiation is contained within the core by total internal reflection at the interface between the core and the cladding. Some fibers have a uniform index of refraction across the cross-section. In such fibers the entire fiber functions as a core and the surrounding ambient functions as the cladding.

The most common and best known use for optical fiber is for data communications. A typical single mode fiber used for data communications has an overall diameter of 125 micrometers with a core having a diameter of 8.5 to 10 micrometers. A multimode fiber having a graded index core typically will also have an overall diameter of 125 micrometers with a core in the range of 50 to 62.5 micrometers. Other multimode fibers may have cores as large as 200 micrometers and overall diameters ranging from 230 micrometers all the way up to 1 millimeter.

Optical fiber may also be used for purposes of illumination. Although it is possible to use optical fibers having sizes similar to those used in data communications for illumination, it is preferable to use larger fibers. Larger fibers permit greater quantities of light to be conducted thereby increasing the amount of illumination possible. Optical fibers used for purposes of illumination may have overall diameters as large as a few centimeters. Furthermore, fibers used in data communications are typically either glass or glass polymer composites where the core is glass and the cladding a polymer. Fibers used for purposes of illumination are typically all polymer. This is because the polymer fibers are less expensive, especially in the large diameters used in illumination systems while the low loss characteristics provided by glass that are necessary in long distance data communications are not as important in the relatively short distances that light is conducted in a fiber used for illumination purposes.

U.S. Pat. No. 5,009,020 (Watanabe) teaches the use of optical fiber for illumination purposes in an automobile. A single light source is set in the center of a vehicle and optical fiber is used to conduct light to external lights such as headlights. The Watanabe patent does not, however, teach any system for making the light source uniform or collimating the light. Those tasks are accomplished by the light fixture into which the optical fiber inserts the light.

Numerous patents have issued to Maurice Daniel on the subject of weaving optical fibers in order to product microbends. Typical of these patents is U.S. Pat. No. 4,234,907. Some light will escape at each of these bends. A system such as this produces a very flat light source. Uniformity may be achieved by increasing the tightness of the weave as distance from the light source increases. There is no good way to increase collimation of the light, however. Furthermore, by the very nature of the weave, microbends appear on both sides of the woven layer. Therefore the light will escape from both sides of the woven mat. In most applications light is desired on only one side of the panel so this will inherently waste some of the light.

Commonly-assigned U.S. patent application Ser. No. 07/963,056 (Appeldorn et al.) U.S. Pat. No. 5,432,876, the teaching of which is incorporated herein by reference, teaches the use of notches in optical fibers to extract light. The light is extracted by total internal reflection from the notch. The level of illumination may be made uniform across the emitting area by increasing the depth of the notches as distance from the light source increases, or decreasing the spacing between notches as distance from the light source increases, or a combination of these techniques. This technique does not suffer from the defect in the Daniel woven system in that substantially all of the light is extracted on one side of the fiber. There is no teaching, however, in this patent of any way of limiting the angular range of the extracted light.

SUMMARY OF THE INVENTION

According to the present invention, an optical fiber has a core. A notch hiring first and second sides is formed in the fiber and extends into the core. At least the portion of the interior of the notch adjacent the first side has an index of refraction less than that of the core. Light travelling at a first angle to the fiber axis and striking the first side will be totally internally reflected if the first angle is greater than a predetermined angle. If the first angle is less than the predetermined angle, a portion of the light will enter the notch and emerge through the second surface making a second angle to the first surface, the second angle being greater than the first.

DETAILED DESCRIPTION

Figure 1:
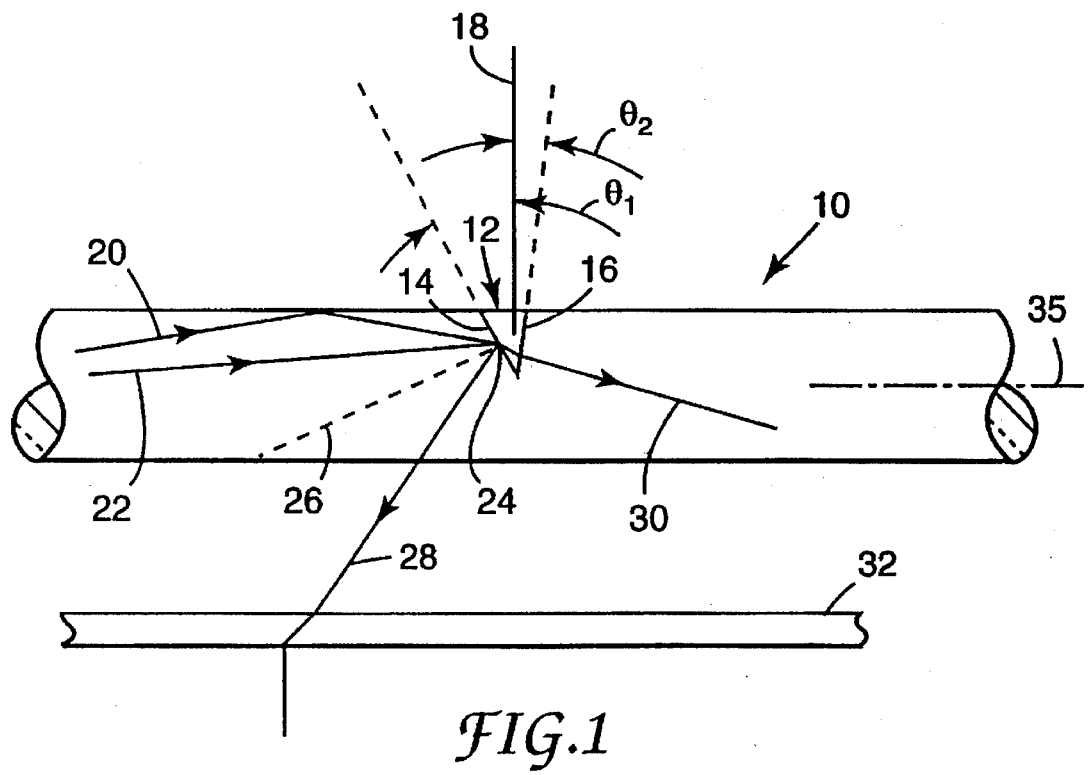
FIG. 1 is a side view of a first embodiment of a fiber according to the invention.

FIG. 1 shows an illustrative embodiment of the invention. The core of an optical fiber, 10, has a notch 12 cut therein. Fiber core 10 may be surrounded by an optional cladding layer or may use its ambient surroundings as a cladding. Notch 12 has sides 14 and 16. Sides 14 and 16 of notch 12 are preferably of optical quality, meaning that their surface variation is small in comparison with the wavelength of the light to be conducted in fiber core 10. Side 14 makes an angle $\theta_1$ to a normal 18 to the optical fiber. Side 16 makes an angle $\theta_2$ to normal 18.

Two exemplary light rays 20 and 22 are shown in core 10. Both strike surface 14 at point 24. Light ray 20 makes an angle with normal 26 to surface 14 that is greater than the critical angle. Thus light ray 20 is totally internally reflected at surface 14 and proceeds along path 28. Light ray 22 makes an angle with normal 26 that is less than the critical angle and thus passes through surface 14. Light ray 22 is refracted at surface 14 and again at surface 16 where it reenters core 10 following path 30.

The proper selection of angles $\theta_1$ and $\theta_2$ will optimize performance of a lighting fixture utilizing the present invention. In order to select an appropriate size for $\theta_1$, the desired range of output angles, the index of refraction of the core, the index of refraction of the interior of notch 12, and the range of angles that light traveling in core 10 make with the axis of core 10 must all be known. The range of angles that light makes with the axis of core 10 is generally controlled by one of two factors. These are the numeric aperture (NA) of the optical fiber and the nature of the light source. The NA of the fiber will define the maximum range of angles that the fiber will accept for insertion. If the light source emits light over a range of angles equal to or greater than the NA of the fiber will allow it to accept, the NA will control the range of angles that light in the fiber makes to the fiber axis. Clearly, however, if the light source emits light over a range of angles less than the NA of the fiber would accept, the light source itself will control the range of angles that light makes to the axis 35 of core 10. If $\alpha$ is the range of angles over which light is to be emitted from the fiber after reflection from a notch and $\beta$ is the range of angles that light travelling in core 10 makes to axis 35 of core 10, $\theta_1 = CA - \beta + \alpha$ where CA is the critical angle determined by the relative indices of refraction of core 10 and the interior of notch 12. The value of $\alpha$ for a particular light source must be selected on the basis of the intended use for that light source, but, in general, values in the range of 10 to 20 degrees are preferred. Of course for the range of angles made by the output light to be limited to $\alpha$, the reflecting surface must be of optical quality. For these purposes optical quality means the surface is sufficiently smooth that it acts as a specular reflector.

As may easily be seen from FIG. 1, there are two classes of rays of light that will not be extracted by notch 12. The first class is the group of light rays that do not strike surface 14. The number that fall into this category is determined by the depth of notch 12 into core 10. The second category are those that, like light ray 22, strike surface 14 at an angle less than the critical angle. Some of the light striking surface 14 at an angle less than the critical angle will be reflected, as always occurs when light encounters a change in index of refraction, but the majority will pass through notch 12 only to reenter fiber 10. Light ray 22 is, however, refracted at each of interfaces 14 and 16. Therefore, $\theta_2$ is chosen such as to refract the light so that it will be deviated to travel at a greater angle to axis 35 of the core than it did before passing through notch 12. There are numerous possibilities for such an angle. The basic rule for a notch 12 that is filled with air, however, is that $\theta_2$ must be less than $\theta_1$. It is even possible for $\theta_2$ to be negative. In such a case surface 16 would be on the same side of normal 18 as surface 14. The effect of the redirecting done by surface 16 is to deviate at least some of the light that struck surface 14 at an angle less than the critical angle onto a path such that it will strike a later notch at an angle greater than the critical angle. This light will then be extracted by a subsequent notch. Although it is preferred that surface 16 be of optical quality, it is not as important as it is that surface 14 is of optical quality.

As the difference in indices of refraction of the core and the interior of the notch increase, the critical angle will decrease. As the critical angle decreases, the range of angles of incidence that will cause light to be extracted increases. If notch 12 is filed with air and core 10 is of a material typically used in polymer optical fibers, the critical angle will be small enough that, in order to get a desirably small angular distribution of the output, $\theta_1$ must be small. The result is that much of the extracted light will be directed at an angle back along the fiber toward the light source. This is shown in FIG. 1. The optical fiber may be placed at such an angle as to have the light extracted travel in the desired direction or a Fresnel lens or other beam turning device 32 may be used to redirect the light in a direction perpendicular to the optical fiber.

Figure 2:
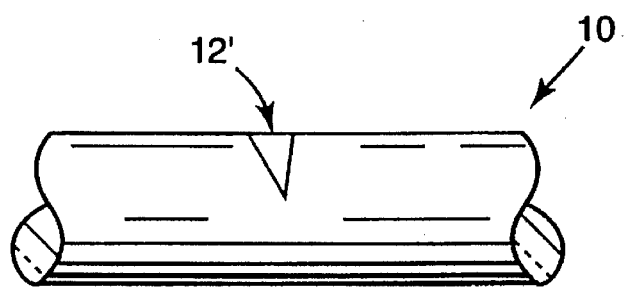
FIG. 2 is a side view of a second embodiment of a fiber according to the invention.

FIG. 2 shows an alternative embodiment of the present invention. In the embodiment of FIG. 2, core 10 has a notch 12'. Notch 12' is filled with a transparent material having an index of refraction less than that of core 10, but greater than that of air. The advantage of using a material as shown to fill notch 12' is that it reduces the difference in index of refraction between core 10 and notch 12'. This, in turn, increases the critical angle of the interface between core 10 and notch 12'. That allows $\theta_1$ to be greater and still maintain a desirably narrow range of output angles. This provides two advantages. One is that, with the proper selection of an index of refraction differential, light may be extracted directly in a desired direction, commonly perpendicular to the fiber having core 10, and turning lens 32 of FIG. 1 may be eliminated. Additionally the construction of FIG. 2 is easier to manufacture because since $\theta_1$ is larger, $\theta_2$ may be larger as well. Thus notch 12' is much wider than notch 12 and easier to cut or otherwise manufacture.

Figure 3:
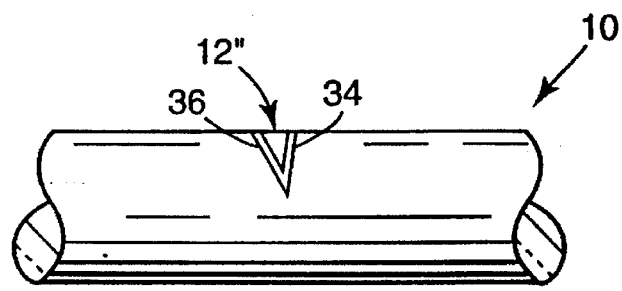
FIG. 3 is a side view of a third embodiment of a fiber according to the invention.

FIG. 3 illustrates another embodiment of the invention. In FIG. 3, core 10 has a notch 12". Inside notch 12" is a transparent material 34 having an index of refraction less than that of core 10. Generally layer 34 will be made thin, but it must be thick compared with the wavelength of the light to be extracted from core 10. Within low index material 34 is another material 36. Material 36 may have any index of refraction other than that of core 10. In one embodiment material 36 has a higher index than core 10. As the light passes from low index material 34 to high index material 36, it will be refracted increasing the angular dispersion of the light. As shown, low index material 34 is coated on both sides of notch 12". It is only necessary, however, that it be on the side to which light will be incident. It will generally, however, be easier to coat it on both sides.

Figure 4:
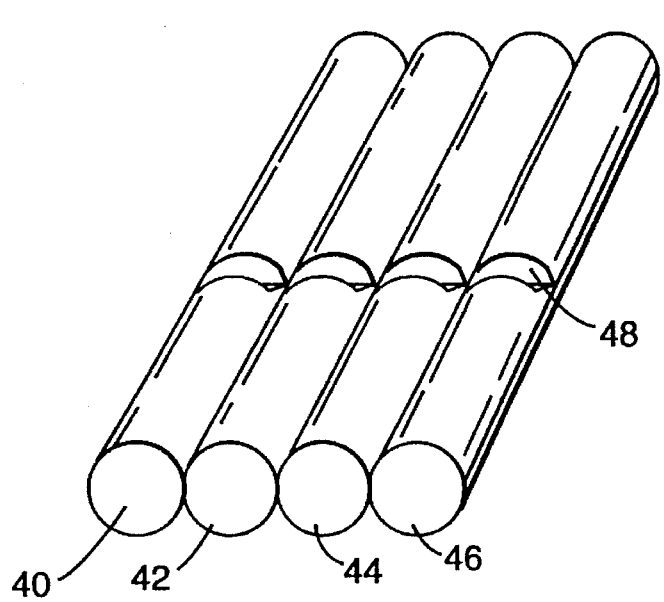
FIG. 4 is a perspective view of a first embodiment of a fiber array according to the invention.

Normally light fixtures of the present invention will be formed by making an array of fibers all notched in accordance with the present invention. Such an array may be formed by tatting a group of fibers and laying them side by side. Alternatively an array of fibers may be extruded or otherwise molded as one piece as shown in FIG. 4. As shown in FIG. 4, four fibers 40, 42, 44, and 46 have a notch 48 extending there across. Further the notch could be molded into the fiber or array or could be cut into it at a later time.

Figure 5:
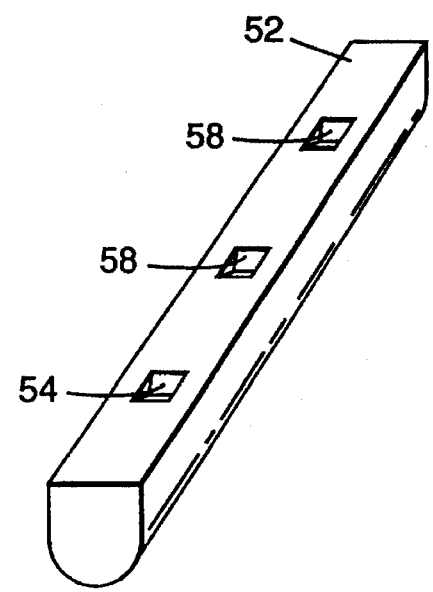
FIG. 5 is a perspective view of a fourth embodiment of a fiber according to the invention.

It is also not necessary that a fiber for use in the present invention be round. Some actual advantages are provided by other shapes. One such shape is shown in FIG. 5. The shape shown in FIG. 5 includes a core 50 in an optical fiber having a flat side 52 with notches 54, 56, and 58 in flat side 52. The use of the square side 52 provides an advantage because it will help to mix the light in a circular manner rather than allowing some of the light to continue to be reflected back and forth in a single plane within the fiber.

It will be apparent to those of skill in the art that the present invention only affects collimation of the light in a plane parallel to the optical fiber. In reality, however, a typical light fixture will also have improved collimation in the plane perpendicular to the length of the fiber. That is because the curved side through which the light is released will act as a lens reducing the divergence of the extracted light.

Figure 6:
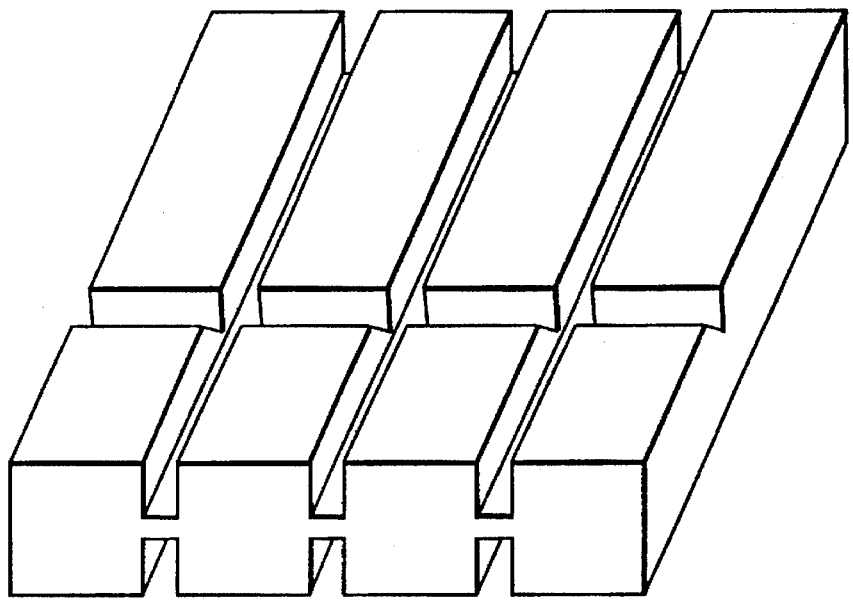
FIG. 6 is a perspective view of a second embodiment of a fiber array according to the invention.

FIG. 6 shows an alternative to the embodiment of FIG. 4. In the embodiment of FIG. 6, an array of square fibers is manufactured. As in the array of FIG. 4, it could be manufactured by casting or by extrusion or other known techniques. As a further alternative, a plurality of fibers of the form of the fiber shown in FIG. 5 could be extruded as an array similar to the array of FIG. 4 or the one of FIG. 6.

Those skilled in the art will understand that only exemplary embodiments have been described and that the present invention is not so limited. For example, only "v" grooves have been shown or described, but the groove could have other shapes.

What is claimed is:

1. An optical fiber having a core, said core having a central axis, said fiber having a notch having first and second sides and extending into said core, a portion of said notch adjacent said first side having an index of refraction less than that of said core such that light being conducted within said core and making a first angle with said axis and striking said first side will be totally internally reflected and extracted from said fiber if said first angle is greater than a preselected angle and if said angle is less than said preselected angle a portion of said light will enter said notch, wherein said light entering said notch will return to said core through said second side at a second angle to said axis, said second angle being greater than said first angle.

2. The optical fiber of claim 1 wherein said first side of said notch is coated with a first material having a lower index of refraction than said core.

3. The optical fiber of claim 2 wherein said notch contains a second material with an index of refraction different from that of said core and that of said first material.

4. The optical fiber of claim 3 wherein said second material has an index of refraction that is higher than that of said core.

5. The optical fiber of claim 1 wherein said first side makes an angle $\theta_1$ with a normal to said axis and said second side makes an angle $\theta_2$ with a normal to said axis, $\theta_1$ being greater than or equal to $\theta_2$.

6. The optical fiber of claim 5 wherein $\theta_1$ is greater than $\theta_2$.

7. The optical fiber of claim 1 wherein said notch is filled with a material having a lower index of refraction than that of said core.

8. An array of optical fibers, each fiber having a core said core having a central axis, each of said fibers having a notch having first and second sides and extending into said core, a portion of said notch adjacent said first said having an index of refraction less than that of said core such that light being conducted within said core and making a first angle with said axis and striking said first side will be totally internally reflected and extracted from said fiber if said first angle is greater than a preselected angle and if said first angle is less than said preselected angle a portion of said light will enter said notch, wherein said light entering said notch will return to said core through said second side at a second angle to said axis, said second angle being greater than said first angle.

9. The array of optical fibers of claim 8 wherein said first side of each of said notches is coated with a first material having a lower index of refraction than said core.

10. The array of optical fibers of claim 9 wherein each of said notches contains a second material with an index of refraction different from that of said cores and that of said first material.

11. The optical fiber of claim 10 wherein said second material has an index of refraction that is higher than that of said cores.

12. The optical fiber of claim 8 wherein each of said first sides makes an angle $\theta_1$ with a normal to said axis and said second side makes an angle $\theta_2$ with a normal to said axis, $\theta_1$ being greater than or equal to $\theta_2$.

13. The optical fiber of claim 12 wherein $\theta_1$ is greater than $\theta_2$.

14. The array of optical fibers of claim 8 wherein each of said notches is filled with a material having a lower index of refraction than that of said core.

15. The array of optical fibers of claim 8 wherein said fibers are joined together.

* * * * *